March 9, 1954 — O. A. CARNAHAN — 2,671,469
BALANCED VALVE STRUCTURE
Filed Sept. 26, 1950 — 2 Sheets-Sheet 1

O. A. Carnahan, Inventor
By Henninger & Pillans, Attorneys

March 9, 1954

O. A. CARNAHAN 2,671,469

BALANCED VALVE STRUCTURE

Filed Sept. 26, 1950

O. A. CARNAHAN Inventor

By Henninger & Pillars
ATTORNEYS

Patented Mar. 9, 1954

2,671,469

UNITED STATES PATENT OFFICE 2,671,469

BALANCED VALVE STRUCTURE

Orson A. Carnahan, Syracuse, N. Y.

Application September 26, 1950, Serial No. 186,874

3 Claims. (Cl. 137—711)

This invention relates to improvements in balanced valve structures and more particularly to float controlled valves for use in controlling the admission of water to tanks or other receptacles, such as toilet bowls, stock feeding troughs, and the like.

Although many valve mechanisms have heretofore been suggested for controlling the filling of toilet bowls and the like, the valves known in the art have been found deficient due to a number of factors, one of which is the fact that they operate satisfactorily only with a supply source having a limited pressure range. Further, ball valves which have heretofore been utilized close without a positive movement, thus necessitating a longer filling period for the tank. Further, float controlled valves as exemplified by the prior art, have been found objectionable due to the fact that the water passing therethrough generates sound frequencies in the upper audible range. The resultant sound which may be alikened to whistling noises oftentimes reaches a crescendo during closure of the valve. The objectionable sound waves are emitted during flow due to the fact that air which is either entrapped or dissolved in the supply water is permitted to escape, causing cavitation and the generation of audible frequencies. Escapement of the dissolved air results from the fact that velocity heads which occur during flow of the water between the chambers of the valves known in the art, serve to reduce the pressure of the fluid to a value approaching that of the vapor pressure of water.

It is, therefore, an object of this invention to provide an improved float actuated valve wherein the valve stem is balanced by the pressure of the water to enable the valve to operate over a very extended range of supply pressures.

Another object of the invention is to provide an improved float controlled valve which positively closes at a predetermined float level irrespective of the pressure of the water supply.

Another object of the invention is to provide an improved float controlled balanced valve wherein the pressure of the supply fluid is decreased in stages as it passes through the valve, the individual pressures of which in all instances exceed the vapor pressure of water, so that cavitation and hence the generation of objectionable sound frequencies cannot occur.

A further object of the invention is to provide an improved float controlled valve wherein, during closing, the flow of liquid is reduced prior to the complete closure of the valve, thus reducing wear of the valve and packing material.

A still further object is to provide an improved ball type valve formed with relatively few parts that may be easily and quickly assembled, or dismantled for inspection or replacement.

The invention also resides in certain novel characteristics which necessitate the carrying out of the foregoing objects and which contribute both to the simplicity of the float actuated valve and to its ruggedness of construction as well as to the dependability of its operation.

Other objects and advantages of the invention will become apparent from the following detailed description taken in connection with the accompanying drawings, in which:

Figure 3 is a fragmentary cross sectional view of a modified form of the flow resisting element of the valve structure shown in Figure 1.

Figure 1:
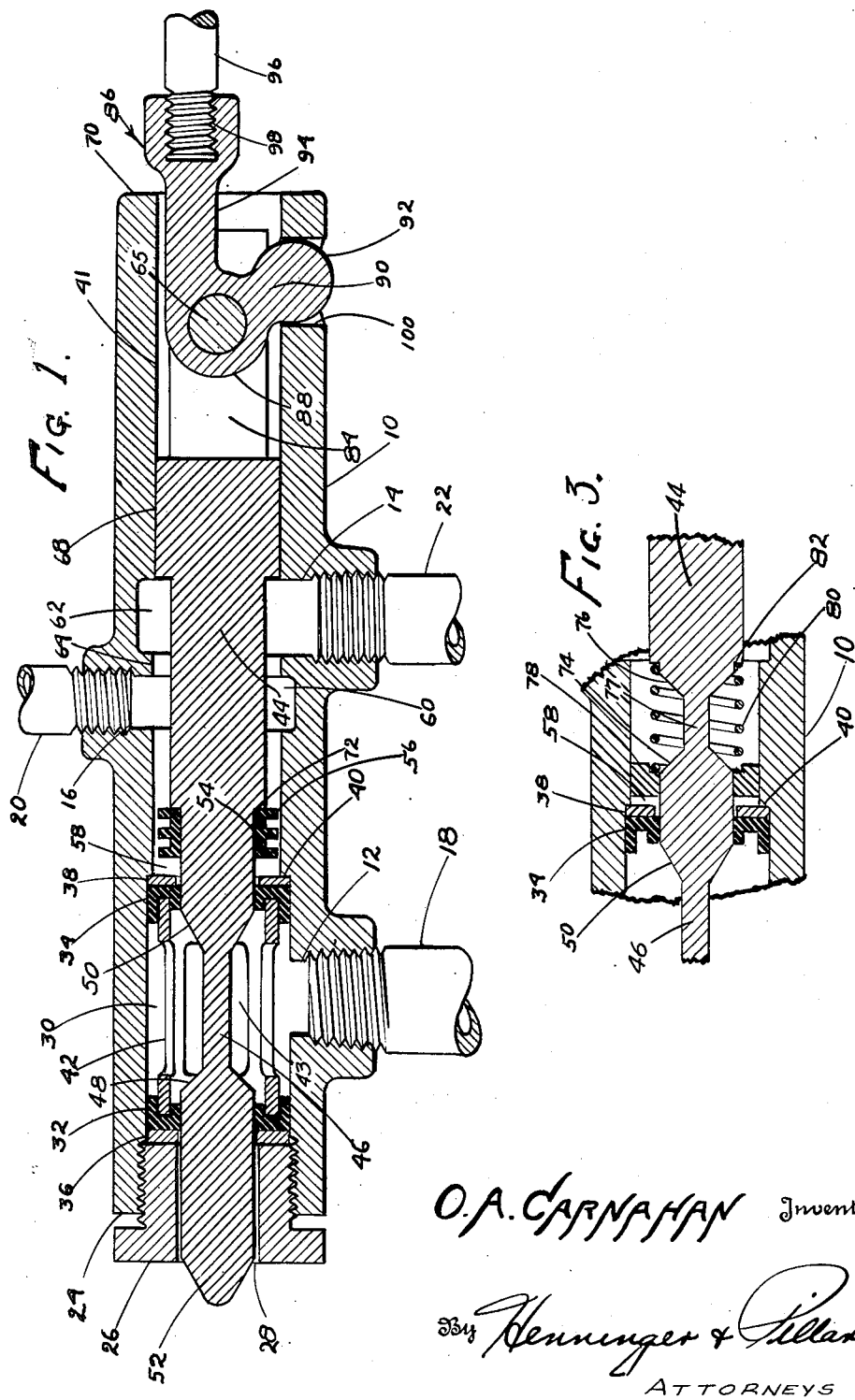
Figure 1 is a cross sectional view partly in elevation of the improved float controlled valve showing the parts thereof in closed position.

While the invention is susceptible of various modifications and alternative constructions, I have shown in the drawings and will herein describe in detail the preferred embodiments. It is to be understood, however, that I do not intend to limit the invention by such description, for I aim to cover all modifications and alternative constructions falling within the spirit and scope of the invention as defined in the appended claims.

Figure 2:
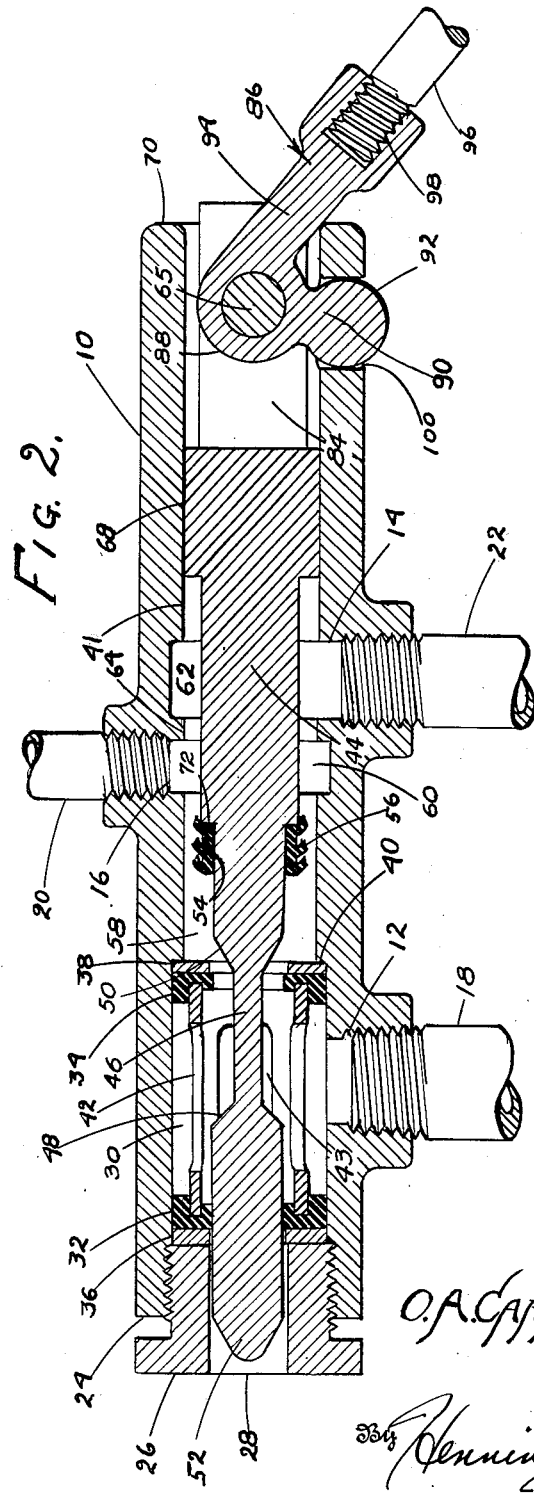
Figure 2 is a cross sectional view partly in elevation showing the parts of the valve mechanism in open position.

Referring to Figures 1 and 2, the balanced float controlled valve of my invention is formed with an elongated valve casing 10 which is provided with an annular opening therein. Inlet orifice 12 and outlet orifices 14 and 16 are formed in the valve casing. Each of the orifices 12, 14 and 16 is provided with threads which coact with the external threads of inlet pipe 18 and outlet or discharge pipes 20 and 22 respectively. The end 24 of the valve casing 10 adjacent to the inlet orifice 12 is internally threaded to receive the threads of plug 26. The plug is provided with a central aperture or opening 28 which extends through the body of plug 26 in axial alignment with the annular opening of valve casing 10.

An inlet chamber 30 is formed within the hollow valve casing by the use of annular packing members 32 and 34 which are fixedly mounted in spaced relation to each other transversely of the opening within the valve casing 10. Annular packing members 32 and 34 engage the interior wall of the opening within valve casing 10 and are provided with apertures located in axial alignment with the axis of the opening. Annular packing member 32 is positioned adjacent to plug 26 with a supporting washer 36 placed intermediate thereof. Annular packing member 34 is similarly placed in contact with a supporting washer 38 which is positioned with a portion of the side thereof opposite the packing member in contact with an annular ledge 40 which is formed in the interior wall of valve casing 10.

A spacing cage 42 in the form of a cylindrical member having a plurality of apertures 43 in the wall thereof is positioned between annular packing members 32 and 34. As is shown in Figures 1 and 2, the annular packing members are each formed with an annular groove into which the ends of the spacing cage 42 are positioned. The annular packing members are formed of resilient material, such, for example, as natural rubber, synthetic rubber, or other types of material having a resilient characteristic. It will be noted that annular ledge 40 is located within valve casing 10 between inlet orifice 12 and outlet orifices 14 and 16 so that annular packing member 34 which is in abutting relation with supporting washer 38 is fixedly positioned within the valve casing adjacent to this location. When supporting washer 38, annular packing member 34, spacing cage 42, annular packing member 32, and supporting washer 36 are assembled in the manner shown in Figures 1 and 2, the assembly may be tightened together by rotation of plug 26 in end 24 of the valve casing to secure the annular packing members in position to define the inlet chamber 30 which communicates with inlet pipe 18 through orifice 12. Additionally, annular packing member 34 and supporting washer 38 serve as dividing means between the inlet chamber 30 and the remainder of the annular chamber within the valve casing which will hereinafter be referred to as the outlet chamber. The interior wall portion 41 of the valve casing serves as a bearing guide as will be hereinafter explained.

Valve stem 44 which extends through the apertures of annular packing members 34 and 36 is mounted for reciprocating movement within valve casing 10. The valve stem is formed with a cylindrical bearing surface 68 adjacent to one end thereof which coacts with interior wall portion 41 of the valve casing to guide the valve stem during its reciprocating movement within the casing. The valve stem is provided with a reduced cross section identified by reference numeral 46 which is formed by shoulders 48 and 50. As is shown in the drawings, shoulders 48 and 50 are formed with an inclined or conical configuration and are oppositely disposed with respect to each other. In the closed position of the valve, the reduced cross section 46 of valve stem 44 is positioned within inlet chamber 30 as is shown in Figure 1. In this position a liquid seal is provided between annular packing members 34 and 36 and the portions of the valve stem at each side of the reduced cross section which are in contact therewith. An end 52 of the valve stem 44 extends through supporting washer 36 and aperture 28 of plug 26 in addition to annular packing member 32. The portion 54 of valve stem 44 positioned within the outlet chamber serves as a supporting member for a flow resisting element 56. Flow resisting element 56 is located in spaced relationship to annular packing member 34 and supporting washer 38 and serves to define an intermediate pressure chamber 58 within the outlet chamber. Outlet pipes 20 and 22 are in communication through outlet orifices 16 and 14 with discharge chambers 60 and 62 respectively which form a part of the outlet chamber. Flow resisting element 56 is located between intermediate pressure chamber 58 and discharge chamber 60, and, as is shown in Figures 1 and 2, discharge chamber 60 is positioned between flow resisting element 56 and discharge chamber 62. An annular baffle member 64 is located between discharge chambers 60 and 62 to function in a manner as will be hereinafter explained.

Flow resisting element 56 is shown in Figures 1 and 2 in the form of a cylindrical member formed of resilient material, such as natural or synthetic rubber. The element is provided with a plurality of annular grooves in the outer surface thereof which serve to form a plurality of flanges extending radially from the body of the cylindrical member. The flanges are positioned in substantially parallel relationship, circumferentially of the cylindrical member. Valve stem 44 is provided with a ledge or shoulder 72 against which the flow resisting element abuts when it is located in operative position upon valve stem 44. It will be noted from Figure 1 that the radial flanges of the flow resisting element, when the valve is in closed position, extend radially to substantially close the passageway in the outlet chamber of the valve casing between intermediate pressure chamber 58 and discharge chamber 60. When the valve is in open position, as is shown in Figure 2, the flow of liquid serves to deform or distort the flanges in the direction of flow to provide an enlargement in the flow passage between pressure chamber 58 and discharge chambers 60 and 62.

A modified form of valve stem 44 and flow resisting element is shown in Figure 3. In the alternative form, valve stem 44 is provided with opposed shoulders 74 and 76 which are positioned in spaced relationship to provide a reduced cross section 77 in the valve stem. A baffle element 78 which is movably supported for reciprocating movement is positioned transverse of the opening in valve casing 10. The baffle element 78 comprises an annular packing ring through which valve stem 44 extends. When the valve is closed, baffle element 78 is biased to a position adjacent to supporting washer 38 by compression spring 80 which is located between baffle element 78 and a shoulder 82 formed in valve stem 44. As will be noted from Figure 3, compression spring 80 extends across the reduced section 77 of the valve stem 44.

The terminal end of valve stem 44 adjacent to bearing surface 68 is provided with a crosswise slot 84 formed centrally within the valve stem in which a cam element 86 is mounted for oscillating movement. As is shown in Figures 1 and 2, cam element 86 is pivotally secured in slot 84 by a pivot or hinge pin 65 which passes through aligned apertures in opposite sides of valve stem 44 and an opening in the body portion 88 of cam element 86.

Cam element 86 is provided with a cam arm or lever 90 and a cam 92 which extend from the body portion 88 in which the hinge pin aperture is positioned. A lever arm 94 is connected to body portion 88 and extends in acute angular relationship with respect to cam arm 90. A float arm 96 is connected to cam arm 94 preferably by coacting threaded portions 98, although other connecting means, such, for example, as set screws, rivets, locking nuts and the like, may be employed. Cam 92 comprises an enlarged terminal portion of cam arm 90 which is provided with a curved surface, the curvature of which is about an axis substantially parallel to the axis of hinge pin 65. Further, the curved surface of cam 92 is beveled on each of the sides of cam arm 90 to provide a sector of substantially a sphere which serves as the effective cam surface. Valve casing 10 is provided with a cylindrical opening 100 which is positioned adjacent to end 70. When cam element 86 is secured to valve stem 44 by hinge pin 65, cam arm 90 is positioned within cylindrical opening 100 as is shown in Figures 1 and 2, whereby the interior surface or wall of the cylindrical opening 100 serves as a cam follower for cam 92.

Movement of cam element 86 about hinge pin 65 results in a camming action between the surface of cam 92 and the wall of cylindrical opening 100 and as a result thereof, valve stem 44 is reciprocated within valve casing 10. It will be understood that cam element 86 is oscillated about hinge pin 65 by the buoyant force of a float (not shown) acting through float arm 96 as the water level in a tank or other receptacle is raised or lowered.

The aforedescribed mechanism for reciprocating valve stem 44 in valve casing 10 pursuant to the height of liquid level in a tank or other receptacle is described and claimed in my co-pending application Serial No. 49,052 filed September 13, 1948.

The operation of my improved balanced float actuated valve will be described in conjunction with the filling and discharge of a toilet bowl or other tank. In Figure 1, the parts are shown in the position which they assume when the flush tank is filled and the flow of water thereto is stopped. In this position, the valve is closed, since a fluid seal is established between annular packing members 32 and 34 and the coacting portions of valve stem 44. The pressure of the supply liquid entering inlet pipe 28 creates a pressure in inlet chamber 30, which pressure acts upon shoulders 48 and 50 with equal force so that there is no tendency of the valve stem to move. The water pressure within inlet chamber 30 also acts upon the inner sides of the interior surfaces of annular packing members 32 and 34 further to effect a positive liquid seal between these members and valve stem 44. Due to the pressure balance and manner of sealing, my valve is suitable for use with supply pressures extending over a wide range and is particularly capable of operation with high values of pressure.

Upon the flushing of a toilet or removal of water from other types of tanks, the liquid level is lowered which results in a lowering of the float connected to float arm 96. This causes cam element 86 to be rotated about hinge pin 65 in a clockwise direction to rotate the surface of cam 92 in cylindrical opening 100. The resultant camming action causes valve stem 44 to be moved toward end 70 of valve casing 10. When the outer edge of shoulder 50 clears annular packing member 34, fluid flows from inlet chamber 30 between annular packing member 34 and shoulder 50 into intermediate pressure chamber 58, and from there to discharge chambers 60 and 62. Flow resisting element 56 is deformed in the manner depicted in Figure 2 and serves to impede the flow of liquid from intermediate pressure chamber 58. There is thus established in the intermediate pressure chamber a pressure which is less than the pressure existing in inlet chamber 30 and greater than the pressure existing in discharge chambers 60 and 62. The pressure of intermediate chamber 58 acts upon the flow resisting element 56 to move the valve stem 44 toward end 70 of the valve casing, and thus aids in opening the valve structure. The pressure of the liquid acting upon the flow resisting element serves to move the valve stem into a substantially open position with a very rapid movement of valve stem 44. This rapid movement of valve stem 44 serves to achieve a sufficiently large opening in a very brief period of time to prevent the creation of a velocity head which would serve to reduce the pressure of the liquid substantially below the value of water vapor pressure, thereby preventing the escapement of air from the water and the creation of cavitation. In this manner the generation of objectionable audible sound frequencies is prevented at this point in the flow path. Thus it will be seen that the first stage of decreased pressure occurs in the intermediate pressure chamber 58. As the flow continues toward the discharge orifices of the outlet chamber, the annular grooves in the flow resisting element 56 serve further to decrease the pressure in progressive stages without permitting the occurrence of excessive velocity heads. The pressure further decreases in the flow path between the flow resisting element and discharge chamber 60 from which a portion of the water is discharged through orifice 19 and outlet pipe 20. The remaining portion flows past baffle 64 where the pressure is decreased in a further stage before it flows through orifice 16 and discharge pipe 22.

From the description thus given, it will be understood that the pressure of the supply water entering the intake chamber 30 is decreased in stages throughout its flow through the valve and the velocity heads created between each of the successive stages are maintained sufficiently low to prevent cavitation and noise.

As the water level in the tank or receptacle rises in height, cam element 86 will be rotated about hinge pin 65 in a counterclockwise direction. The camming action between the cylindrical surface of opening 100 and surface of cam 92 of arm 90 will cause the valve stem 44 to move in a closing direction away from end 70 of valve casing 10. The closing movement of valve stem 44 will be resisted by the pressure existing in intermediate pressure chamber 58. As the valve stem 44 moves in a closing direction, the pressure acting upon the flow resisting element in the intermediate pressure chamber 58 collapses within a brief period of time, thus removing the biasing force acting against the buoyancy of the float. As a result thereof, the valve stem 4 is moved with a positive action irrespective of the pressure of the supply source to a closed position of the valve with a quick or snap action to terminate the flow of liquid. This sudden termination of liquid flow prevents erosion of the material forming shoulder 50 and the material of the annular packing member 34.

A valve structure employing the modified form of flow resisting element shown in Figure 3 functions upon the same principle as that disclosed in Figures 1 and 2. Upon initial opening of the valve by movement of the plunger to provide an opening between shoulder 50 and annular packing member 34, the pressure of the water in the intermediate chamber 58 builds up to the point where baffle element 78 is moved in the direction of flow against the bias of spring 80. As baffle element 78 moves within the valve casing 10 relative to valve stem 44, an opening is created between baffle element 78 and shoulder 74, thus permitting fluid flow to the outlet pipes.

During flow of liquid a substantially constant pressure is maintained in the intermediate pressure chamber 58 owing to the action of compression spring 80. The pressure within the intermediate chamber serves in the same manner as discussed above with reference to the structure shown in Figures 1 and 2.

I claim:

1. In a balanced valve structure for controlling liquid flow, a hollow elongated valve casing provided with an annular chamber therein and a guide bearing positioned adjacent to at least one end thereof, a valve stem slidably supported by said bearing within said casing provided with a reduced cross section formed by a pair of oppositely disposed shoulders located intermediate the ends of the valve stem, annular packing members fixedly mounted within said valve casing transversely of said annular chamber to divide said annular chamber into inlet and outlet chambers with the inlet chamber positioned between said members, each of said annular packing members provided with an aperture through which said valve stem extends, an inlet passage communicating with said inlet chamber and an outlet passage communicating with said outlet chamber, actuating means for reciprocating said valve stem between a closed position wherein said valve stem is in sealing engagement with each of said annular packing members and said reduced section of the valve stem is located within said inlet chamber, and an open position wherein a portion of the reduced section is located within the aperture of one of said annular packing members, and a flow resisting element formed of resilient and flexible material positioned within the outlet chamber in the path of said liquid flow between said reduced section of said valve stem and said outlet passage, whereby the pressure of the liquid in said outlet chamber will be reduced prior to flow through said outlet passage.

2. In a balanced valve structure for controlling liquid flow, a hollow elongated valve casing provided with an annular chamber therein and a guide bearing positioned adjacent to at least one end thereof, a valve stem slidably supported by said bearing within said casing provided with a reduced cross section formed by a pair of oppositely disposed shoulders located intermediate the ends of the valve stem, annular packing members fixedly mounted within said valve casing transversely of said annular chamber to divide said annular chamber into inlet and outlet chambers with the inlet chamber positioned between said members, each of said annular packing members provided with an aperture through which said valve stem extends, an inlet passage communicating with said inlet chamber and an outlet passage communicating with said outlet chamber, actuating means for reciprocating said valve stem between a closed position wherein said valve stem is in sealing engagement with each of said annular packing members and said reduced section of the valve stem is located within said inlet chamber, and an open position wherein a portion of the reduced section is located within the aperture of one of said annular packing members, and a flow resisting element formed of resilient and flexible material supported upon said valve stem in the path of said liquid flow between said reduced section of said valve stem and said outlet passage, whereby the pressure of the liquid in said outlet chamber will be reduced due to its flow past said flow resisting element prior to flow through said outlet passage.

3. In a balanced valve structure for controlling liquid flow, a hollow elongated valve casing provided with an annular chamber therein and a guide bearing positioned adjacent to at least one end thereof, a valve stem slidably supported by said bearing within said casing provided with a reduced cross section formed by a pair of oppositely disposed shoulders located intermediate the ends of the valve stem, annular packing members fixedly mounted within said valve casing transversely of said annular chamber to divide said annular chamber into inlet and outlet chambers with the inlet chamber positioned between said members, each of said annular packing members provided with an aperture through which said valve stem extends, an inlet passage communicating with said inlet chamber and an outlet passage communicating with said outlet chamber, actuating means for reciprocating said valve stem between a closed position wherein said valve stem is in sealing engagement with each of said annular packing members and said reduced section of the valve stem is located within said inlet chamber, and an open position wherein a portion of the reduced section is located within the aperture of one of said annular packing members, and a flow resisting element supported by said valve stem and positioned within said outlet chamber in the path of said liquid flow between said reduced section of said valve stem and said outlet passage, said flow resisting element comprising an annular member formed of resilient material provided with a plurality of radial flanges extending circumferentially of said element and disposed substantially parallel to each other, whereby the pressure of the fluid in said outlet chamber will be reduced prior to flow through said outlet passage.

ORSON A. CARNAHAN.

References Cited in the file of this patent

UNITED STATES PATENTS

| Number | Name | Date |
|---|---|---|
| 517,575 | Knapp | Apr. 3, 1894 |
| 1,173,871 | Royer | Feb. 29, 1916 |
| 1,262,641 | Cockburn | Apr. 16, 1918 |
| 1,630,133 | Murphy | May 24, 1927 |
| 1,988,545 | Donn | Jan. 22, 1935 |
| 2,111,836 | Boyd | Mar. 22, 1938 |
| 2,185,267 | Rice | Jan. 2, 1940 |
| 2,401,237 | Gamble | May 28, 1946 |
| 2,441,220 | Dixon | May 11, 1948 |